Jan. 18, 1944. L. J. HESS 2,339,403
PIPE GUIDE
Filed Aug. 2, 1941
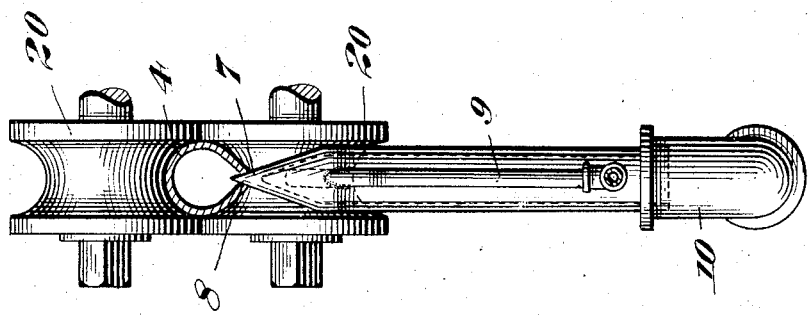
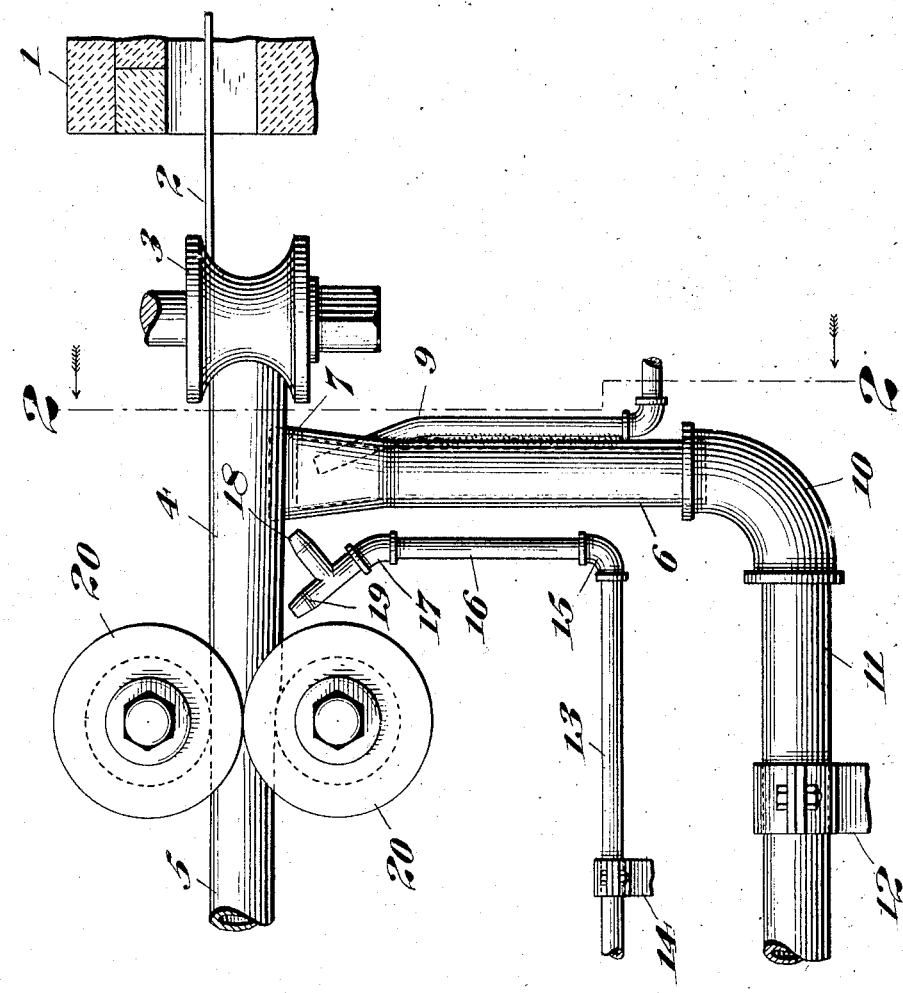
Inventor
Lawrence J. Hess.
By R. S. A. Dougherty.
Attorney Patented Jan. 18, 1944

2,339,403

UNITED STATES PATENT OFFICE 2,339,403

PIPE GUIDE

Lawrence J. Hess, Sparrows Point, Md., assignor to Bethlehem Steel Company, a corporation of Pennsylvania Application August 2, 1941, Serial No. 405,267

7 Claims. (Cl. 78—87)

My invention relates to apparatus for use in continuous butt-welded pipe mills, and more particularly it relates to a water-cooled guide or horn and air blast apparatus for regulating the temperature and cleaning and guiding the material to be made into welded pipe or tubing.

At present, butt-welded pipe or tubing is generally made in continuous mills by heating flat metal strip or skelp in long reheating furnaces, passing the hot skelp through shape rolls to form the skelp into an approximately U-shaped cross-section, over a guide member or horn which aligns and descales the edges of the partially formed skelp, and then passing the still hot skelp through welding rolls to round and weld the skelp into pipe.

As much heat is apt to have been lost before the welding rolls are reached, the application of a strong blast of air, alone or enriched with oxygen, or of gas or steam, to the edges of the skelp just before welding, raises the surface temperature and effectively permits the skelp edges to be butted together at the proper welding heat. This is particularly necessary for light skelp under $\frac{3}{32}$ inch in thickness, which does not retain heat well but will be very rough and pitted and covered with scale if greatly overheated initially.

While the above described system in general works well, it is subject in practice to occasional difficulties with cobbles and caved seams. Cobbling is perhaps more common with the smaller sizes of pipe, of the order of 1½ inches or less in diameter, but it may occur in making any size of pipe by the above described process. Its most usual cause is an overheated guide. When it heats up to the point where the edges of the hot skelp seize the guide, it is drawn into or against the succeeding roll with the skelp, and not only prevents the skelp from closing and welding, but also forces the edges out so that the skelp leaves the rolls more or less flattened again into strip.

Whenever this happens, the entire machine must be stopped and the skelp in the furnace pulled out. The damaged guide must be removed and a new one substituted, and the rolls may also have to be readjusted before the machine can be put into operation again. This may involve the loss of an hour or more of working time for the whole unit, or a production loss in a fast-moving continuous mill of several miles of pipe.

Caved seams are not nearly so costly potentially as cobbles, but they do necessitate the cutting out and scrapping of the lengths of pipe wherein they appear. They are generally the result of deposits of foreign matter, chilled cinder, scale, sand, dirt or the like, scraped from the edges of the skelp and collecting gradually on the guide, readhering as a compacted mass to the hot skelp edges and being carried therewith between the welding rolls to result in unsightly humps and depressions along the weld which impair the weld and destroy the sales value of the pipe.

One object of my invention is therefore to produce an apparatus equipped with suitable cooling means to prevent cobbling due to overheating of the welding guide.

Another object is to provide a longer-wearing welding guide.

Another object is to provide an apparatus having dual air jets for reheating the skelp and at the same time removing chilled cinder or the like from the welding guide.

Still another object is the provision of means for independently adjusting the air jets and guide to promote the most efficient welding of the pipe.

Other and further objects will appear hereinafter in the specification and appended claims.

Having thus given a general description of the advantages and objects of my invention, I shall now in order to make the same more clear, refer to the annexed sheet of drawings forming a part of this specification, and in which like characters of reference indicate like parts.

Figure 1 is a side elevation of apparatus for forming and welding pipe illustrating the rolls and the guide and air blast jets in operative conjunction therewith;

Fig. 2 is a sectional elevation taken on the line 2—2 of Fig. 1.

Referring now to Figure 1, the rear portion of the heating furnace is indicated by reference numeral 1, the skelp at 2, the forming rolls at 3, the partially formed pipe or tube at 4, and the completed pipe at 5. The guide member consists of a large upwardly-projecting pipe 6, which may be of steel or the like but for heat conduction purposes is preferably of bronze or copper, with a closed and flattened tapering tip 7 which projects like a wedge into the longitudinal open cleft or gap 8 which is subsequently to be compressed to form the seam for the weld.

Into the tip 7 is inserted water inlet pipe 9, which is welded or otherwise suitably attached to pipe 6 to produce a rigid and watertight connection therewith. Pipe 6 is removably connected by elbow 10 or the like to waste pipe 11, which is slidably adjustable within bracket 12 mounted on any desired or conventional type of support.

Adjacent to the guide member is mounted air or gas inlet pipe 13, likewise slidably adjustable in a bracket 14, and joined by elbow 15 or the like to pipe 16 which in turn is connected by 45° elbow 17 or a similar fitting to bifurated outlet nozzles 18 and 19, which are directed forwardly toward the guide tip 7 and rearwardly onto the seam gap 8 respectively.

Immediately behind nozzle 19 are mounted the welding rolls 20, which are driven, like the forming rolls 3, by any suitable and convenient source of power, but are so arranged that the central or deepest portion of the groove of the lower welding roll engages the seam gap 8 as aligned by guide tip 9 for welding.

In operation, the skelp 2 heated to approximately welding temperature emerges from rear end of furnace 1 and passes through driven forming rolls 3 wherein it is bent into an approximately oval or horseshoe shape as shown in Figure 2. The partially formed pipe or tube 4 is then advanced by the action of said forming rolls 3 onto the guide tip 9, which projects into the seam gap 8 and straightens and widens the same while supporting the still plastic edges thereof. Water or similar liquid is pumped through water inlet pipe 9 and is sprayed upon the inner surface of the tip 7 for cooling the same, after which the spent liquid is exhausted through waste pipe 11.

Air or gas under pressure is forced through pipes 13 and 15 and their connections to nozzles 18 and 19. The blast from nozzle 18 cleans the guide tip 9 to prevent the inclusion of foreign matter in the welded seam, while that from nozzle 19 raises the edges of the skelp to welding temperature just immediately in advance of and before the entrance of the skelp into the welding rolls 20, which bring the heated edges together under pressure and causes them to coalesce and unite firmly in a weld.

Although I have shown and described my invention in considerable detail, I do not wish to be limited to the exact and specific details shown and described, but may use such substitutions, modifications or equivalents thereof, as are embraced within the scope of my invention or as are pointed out in the claims.

Having thus described my invention, what I claim as new and desire to secure by Letters Patent is:

1. An apparatus for making welded tubing comprising the combination, with forming and welding rolls, of a guide member positioned behind the forming rolls and adapted to engage the edges of the partially formed tubing for aligning and supporting said edges, means for cooling the tip of the guide member with a liquid coolant, and means for applying jets of air or the like to clean the guide member and to heat said edges.

2. An apparatus for making welded tubing from hot skelp comprising the combination, with forming and welding rolls, of an upwardly projecting tapered guiding member for supporting and aligning the edges of the skelp as it emerges from the forming rolls, and a bifurcated air blast pipe for cleaning the tip of the guiding member of foreign matter and heating the edges of the skelp before it enters the welding rolls.

3. An apparatus for making welded tubing from heated skelp comprising the combination, with forming and welding rolls, of a tapered hollow closed guiding member inwardly cooled by water or the like for supporting and aligning the edges of the skelp, and a bifurcated air blast pipe for cleaning the tip of the guiding member of accumulated foreign matter and heating the edges of the skelp before welding.

4. An apparatus for making welded tubing from heated skelp comprising the combination, with forming and welding rolls, of an elongated closed hollow guide inwardly cooled by a jet of flowing water or the like, a bifurcated air blast pipe for cleaning the tip of the guide of foreign matter and heating the edges of the skelp, and means for adjusting longitudinally the position of the air blast pipe as desired.

5. An apparatus for making welded tubing from heated skelp comprising the combination, with forming and welding rolls, of a guide member positioned behind the forming rolls and provided with a tapered liquid-cooled tip for supporting the edges of the skelp, and an air or gas pipe supplied with two diverging nozzles for ejecting blasts of air or gas therefrom, one of said nozzles being adapted to blow foreign matter from the tip of the guide member, and the other said nozzle being adapted to play a heating blast upon the edges of the skelp just previous to welding.

6. An apparatus for making welded tubing from heated skelp comprising the combination, with forming and welding rolls, of a guide member provided with a tapered tip for contacting the skelp having side walls interiorly cooled by a stream of water or the like to prevent the cobbling of the skelp, and means for slidably positioning the guide member for adjusting as desired.

7. An apparatus for making welded tubing including means for forming highly heated flat skelp into tubular form with a longitudinal seam gap defined by the side edges of the skelp, a set of welding rolls spaced from said shaping means and so positioned that the seam gap will be received approximately in the middle of the groove of one of said rolls, and an elongated guide member projecting into said seam gap and supporting the seam edges for a substantial distance after passing through the forming means, said guide member being closed and chambered to house an inwardly circulating liquid medium for cooling the guide member and preventing the formation of cobbles.

LAWRENCE J. HESS.